United States Patent
Huang et al.

(10) Patent No.: US 7,915,569 B2
(45) Date of Patent: Mar. 29, 2011

(54) METHOD FOR CALIBRATING FOCUS LEVEL ON A LIGHT SCRIBE DISC

(75) Inventors: Shih-Wei Huang, Taoyuan County (TW); Shih-Jung Huang, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 679 days.

(21) Appl. No.: 11/971,178

(22) Filed: Jan. 8, 2008

(65) Prior Publication Data
US 2009/0022026 A1 Jan. 22, 2009

(30) Foreign Application Priority Data
Jul. 19, 2007 (TW) ................................ 96126491 A

(51) Int. Cl.
*G02B 7/04* (2006.01)
*G06M 7/00* (2006.01)

(52) U.S. Cl. ...................................... 250/201.5; 250/221
(58) Field of Classification Search ............... 250/201.4, 250/201.5, 201.2, 221, 559.1; 347/224, 225; 369/44.25, 44.29, 53.28, 53.23
See application file for complete search history.

(56) References Cited

U.S. PATENT DOCUMENTS

| | | | | |
|---|---|---|---|---|
| 5,999,503 A * | 12/1999 | Tateishi et al. | ............. | 369/44.29 |
| 7,087,894 B2 * | 8/2006 | Kinoshita et al. | ............. | 250/251 |
| 7,145,842 B2 * | 12/2006 | Kobayashi | ................. | 369/44.11 |
| 2008/0074977 A1 * | 3/2008 | Mizuno | ..................... | 369/53.23 |
| 2008/0298181 A1 * | 12/2008 | Ueno et al. | ................. | 369/44.14 |

* cited by examiner

*Primary Examiner* — Que T Le
*Assistant Examiner* — Pascal M Bui-Pho
(74) *Attorney, Agent, or Firm* — Winston Hsu; Scott Margo

(57) ABSTRACT

A method for calibrating a focus level on a light scribe disc includes driving a pick-up head with a predetermined speed in a predetermined direction to calibrate a focus level for a moving stage, detecting light summed signals along the light path of the moving stage, and finding and recording the maximum light summed signal and corresponding position of the pick-up head as the focus level for the moving stage. When a number of the moving stages is greater than a predetermined value, the focus level of the moving stage serves as the optimum focus level of the light scribe disc. When the number of moving stages is fewer, lowering the speed with a stage reduction and change the direction opposite to the predetermined direction, and proceeding to a next moving stage to calibrate the focus level.

9 Claims, 8 Drawing Sheets

METHOD FOR CALIBRATING FOCUS LEVEL ON A LIGHT SCRIBE DISC

BACKGROUND OF THE INVENTION

1. Field of the Invention

The present invention relates to a method for calibrating the focus level on a label side of an optical disc, and more particularly, to a method for calibrating the focus level on a label side of an optical disc when the label side of the optical disc is performed using light-scribing labels in an optical disk drive having light-scribing functions.

2. Description of the Prior Art

An optical disk drive having light-scribing functions is generally named as a "light scribe", and label sides of optical discs are coated with a light-sensitive dye. When a laser beam generated from an optical pick-up head is focused on the label side of the optical disc and the power of the laser is greater than a certain degree, the label side coating changes and label patterns are generated. Therefore, the optical pick-up head requires a certain focus level to focus and maintain a focal point of the laser beam onto the label side of the optical disc.

FIG. 1 is a prior art method for finding the focus level of an optical disk drive. As shown in FIG. 1, because the distance between an optical pick-up head 1 and an optical disc 2 is different in each optical disk drive, the focal point generated from the optical pick-up head 1 is not precisely on the optical disc 2 and appropriate reflected light from the optical disc 2 is not generated. Therefore, the optical pick-up head 1 needs to be shifted a distance such that the focal point of the laser beam lands precisely on the optical disc 2, to have better a reflected light signal.

The prior art optical disk drive drives an actuator 3 in the optical pick-up head 1 according to an electro-magnetic force generated from voltages, to adjust the position of the objective lens loaded on the actuator 3 and to control the optical pick-up head 1 and the optical disc 2, maintaining a constant distance at the focus level such that the focal point of the laser beam remains on the optical disc 2. Then the optical disc 2 reflects the focused laser beam back to the optical pick-up head 1 and the reflected light is projected onto a light energy converter 4. The light energy converter 4 comprises four equal optical receivers A, B, C, D, wherein each optical receiver receives light from a corresponding region of the reflected light and converts the light to the electrical signal. Next, the electrical signals are amplified by an amplifier 5, and a focus error signal FE is generated by calculating (A+C)−(B+D). Then, the focus error signal FE is inputted into a focus servo unit 6, and the optical pick-up head 1 is shifted up or down to focus the focal point of the laser beam onto the optical disc 2, according to the focus error signal FE and the focus level. However, the uniformity of the dye on the label side of the optical disc is not as uniform as on the data side of the optical disc, and the light reflectivity of the label side is also lower than that of the data side, so the intensity and the stability of the focus error signal FE generated from the label side is not suitable for the focus servo.

Therefore, another method for finding the focus level on the label side is by utilizing electrical signals converted from the optical receivers A, B, C, and D. The electrical signals are amplified by an amplifier 7 and the amplified electrical signals are summed (i.e., (A+B+C+D)) into a light summed signal. The light summed signal is decoded into a data signal by a decoding unit 8. The light summed signal shown in FIG. 2 is generated by shifting the actuator 3 up and down. When the focal point of the laser beam is focused on the disc, the reflected light reaches a maximum intensity, and therefore the optimum focus level is determined by comparing the relative intensities of the signals to find the light summed signal with the greatest intensity.

However, as shown in FIG. 3, when the input voltage drives the optical pick-up head up or down with a constant speed, the actuator 3 in the optical pick-up head cannot immediately have a corresponding displacement and this results in system delay. In addition, the faster the speed that the input voltage drives the optical pick-up head, the more serious the system delay. For example, when the focal point is at position a and position c, the measured maximum intensity of the light summed signal is found. Due to system delay, however, the corresponding position of the actuator 3 is determined to be at position b and position d. Therefore, an accurate focus level cannot be found and influences the accuracy of reading and writing signals, and is further unable to obtain optimum control parameters when the control loop is in a learning mode. Although the system delay could be reduced by driving the optical pick-up head at a lower speed, much more time is then required to find an accurate focus level and the efficiency of the optical disk drive is thus degraded. In particularly, on the label side of the optical disc, there are no data patterns to be compared for other methods for finding the optimum focus level. Therefore, finding the focus level on the label side of the optical disc still suffers many problems.

SUMMARY OF THE INVENTION

It is an objective of the present invention to provide a method for calibrating a focus level on a label side of an optical disc, by quickly lowering the moving speed of an optical pick-up head with a reduction in stages, such that the time of calibrating an optimum focus level can be reduced and the efficiency of the optical disk drive can also be improved.

It is another objective of the present invention to provide a method for calibrating a focus level on a label side of an optical disc, where the optimum focus level can be found by lowering the moving speed of an optical pick-up head with a stage reduction in predetermined stages.

It is another objective of the present invention to provide a method for calibrating a focus level on a label side of an optical disc, the optimum focus level can be found by surveying the convergence of light summed signals corresponding to focus levels.

To achieve the above objectives of the present invention, according to one embodiment of the present invention, the method for calibrating focus level on a light scribe disc comprises driving a pick-up head with a predetermined speed in a predetermined direction to calibrate focus level for a moving stage, detecting light summed signals along the path of the moving stage, finding and recording a maximum among the light summed signals and a corresponding position of the pick-up head as the focus level of the moving stage, counting the moving stages, and checking if a number of the moving stages is greater than a predetermined value. When the number of the moving stages is not greater than the predetermined value, the method includes lowering the predetermined speed with a reduction and changing the direction to be opposite to the predetermined direction, and calibrating focus level for a next moving stage. When the number of the moving stages is greater than the predetermined value, the method includes determining the focus level of the moving stage having the maximum light summed signal as an optimum focus level.

According to another embodiment of the present invention, the method for calibrating a focus level on a light scribe disc comprises driving a pick-up head with a predetermined speed in a predetermined direction to calibrate focus level for a moving stage, detecting light summed signals along the path of the moving stage, finding and recording a maximum among the light summed signals and a corresponding position of the pick-up head as the focus level of the moving stage, and checking if the maximum light summed signal converge into a predetermined value. When the maximum light summed signal does not converge into a predetermined value, the method reduces the predetermined speed to half and changes the direction to be opposite to the direction of the directly previous moving stage, and calibrates the focus level for a next moving stage. When the maximum light summed signal converges into a predetermined value, the method determines the focus level of the moving stage having the maximum light summed signal as an optimum focus level.

These and other objectives of the present invention will no doubt become obvious to those of ordinary skill in the art after reading the following detailed description of the preferred embodiment that is illustrated in the various figures and drawings.

DETAILED DESCRIPTION

To achieve the above objectives of the present invention, preferred embodiments are described in conjunction with figures as follows.

The technology principle of the method for calibrating a focus level on a label side of an optical disc is that the optical pick-up head is a second-order system, the slower the moving speed of the optical pick-up head, the less the optical pick-up head system delay. When the system delay is shorter, the focus level of the optical pick-up head is determined according to when the light summed signal is close to the actual optimum focus level. However, if the moving speed of the optical pick-up head is too slow, finding the optimum focus level of the optical pick-up head requires too much time and further degrades the overall efficiency of the optical disk drive.

To prevent spending too much time on finding the optimum focus level, the method for calibrating the focus level on the label side of an optical disc of the present invention follows these principles: the moving speeds of the optical pick-up head at each moving stage are different, the moving speed at the current moving stage is lower than the moving speed at the directly previous moving stage, and the moving directions are opposite to each other between two adjacent moving stages. In addition, at each moving stage, according to the phenomenon where the greatest intensity of reflected light is generated when the focal point of the laser beam is on the optical disc, the measured maximum light summed signal and the corresponding position of the optical pick-up head are determined and serve as the focus level of the moving stage. After finding the focus level of this moving stage, the method switches to the next moving stage to perform a next calibrating stage, and lowers the moving speed of the optical pick-up head. After the number of the moving stage is equal to a predetermined number, the focus level of the last moving stage is found with an appropriate lower moving speed, and this focus level serves as the optimum focus level of the label side. The next moving stage is switched into after finding the focus level of current moving stage, but the next moving stage can also be switched into after the light summed signal is reduced to a predetermined threshold value.

Figure 1:
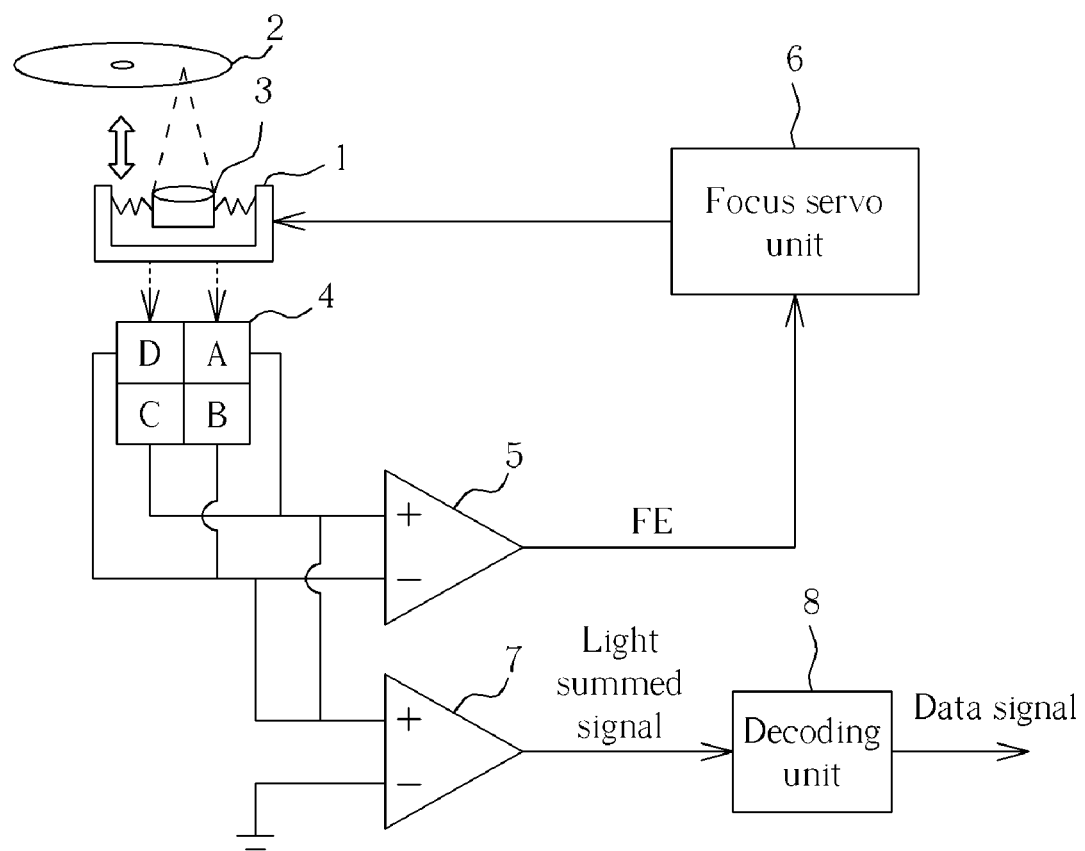
FIG. 1 is a prior art functional block diagram of calibrating a focus level of an optical disk drive.
Figure 2:
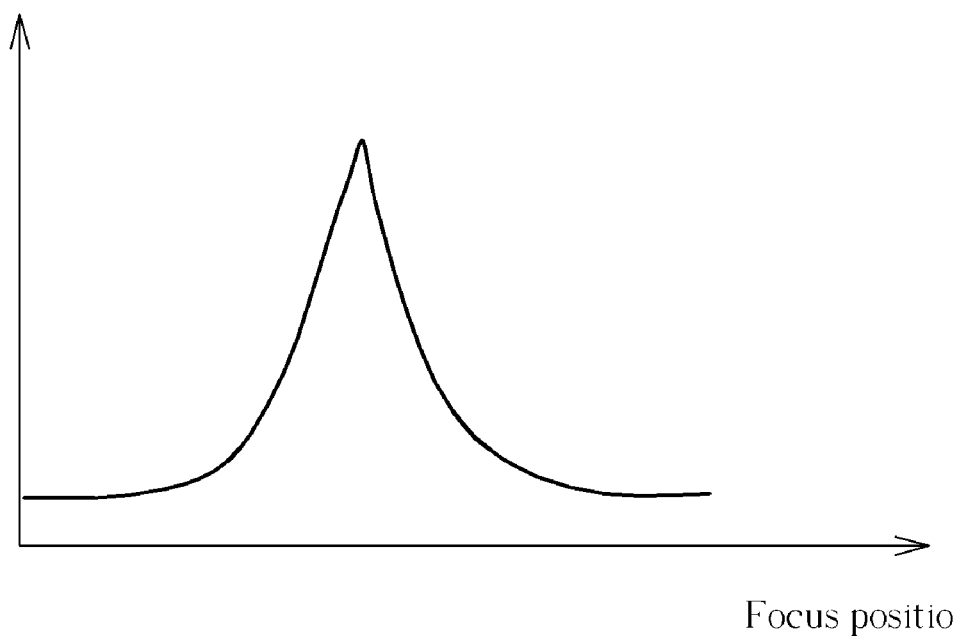
FIG. 2 is a prior diagram illustrating a light summed signal when the optical disk drive performs focus calibration.
Figure 3:
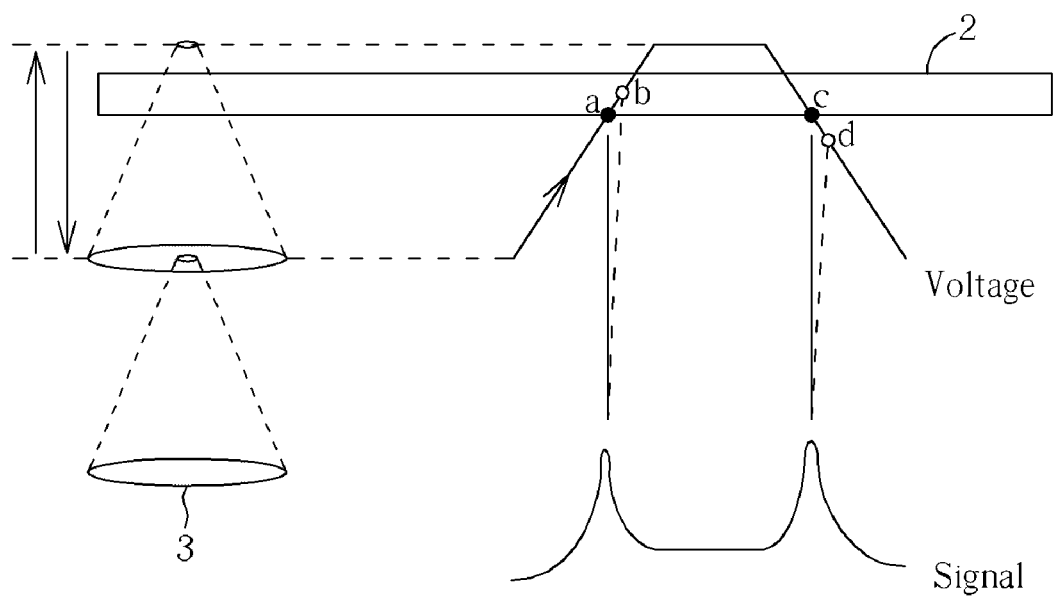
FIG. 3 is a prior diagram illustrating calibrating the focus level on a label side of an optical disc.
Figure 4:
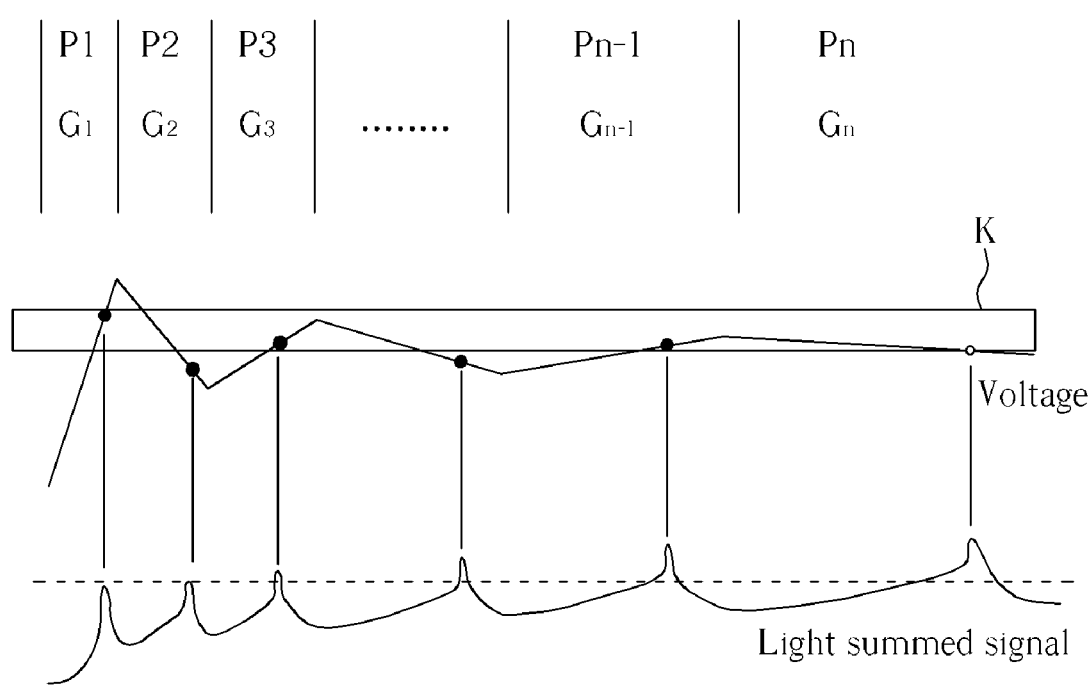
FIG. 4 is a diagram illustrating calibrating a focus level on a label side of an optical disc according to the present invention.

Please refer to FIG. 4. FIG. 4 is a diagram illustrating calibrating a focus level of on a label side of an optical disc according to the present invention. In the present invention, when calibrating the focus level, at a moving stage P1, the optical pick-up head is driven closer to the optical disc K with a predetermined speed G1 by using an input voltage/second, and the light summed signals of each position are detected while the optical pick-up head is moving. Then, the light summed signals of each position are compared and the maximum light summed signal and its corresponding position of the optical pick-up head serve as the focus level of the moving stage P1 (shown in FIG. 4 as a black dot). However, the focus level is different from the optimum focus level due to system delay. To obtain better focus level and to further reduce system error, more calibrations are required.

After obtaining the focus level of the moving stage P1, a moving stage P2 is entered. At the moving stage P2, the optical pick-up head is driven with a moving speed G2 and is driven in a direction opposite to the moving direction at the stage P1, where the moving speed G2 is lower than the moving speed G1. Then, the light summed signals of each position are compared, and the maximum light summed signal and its corresponding position of the optical pick-up head serve as the focus level of the moving stage P2. Because the moving speed G2 is lower than the moving speed G1, the system delay is shorter, therefore the focus level of the moving stage P2 should be closer to the optimum focus level.

After obtaining the focus level of the moving stage P2, a moving stage P3 is entered. At the moving stage P2, the optical pick-up head is driven with a moving speed G3 lower than the moving speed P2 and is driven in a direction opposite to the moving direction at the stage P2 (moving toward the optical disc). Then, the maximum light summed signal and corresponding focus level of the moving stage P3 are determined. Subsequent moving stages are detected iteratively to obtain the maximum light summed signal and the corresponding focus level of each moving stage until moving stage Pn. At the moving stage Pn, the moving speed of the optical pick-up head is slowest and the system delay is smallest, the focus level obtained at the moving stage Pn serves as the optimum focus level.

Figure 5:
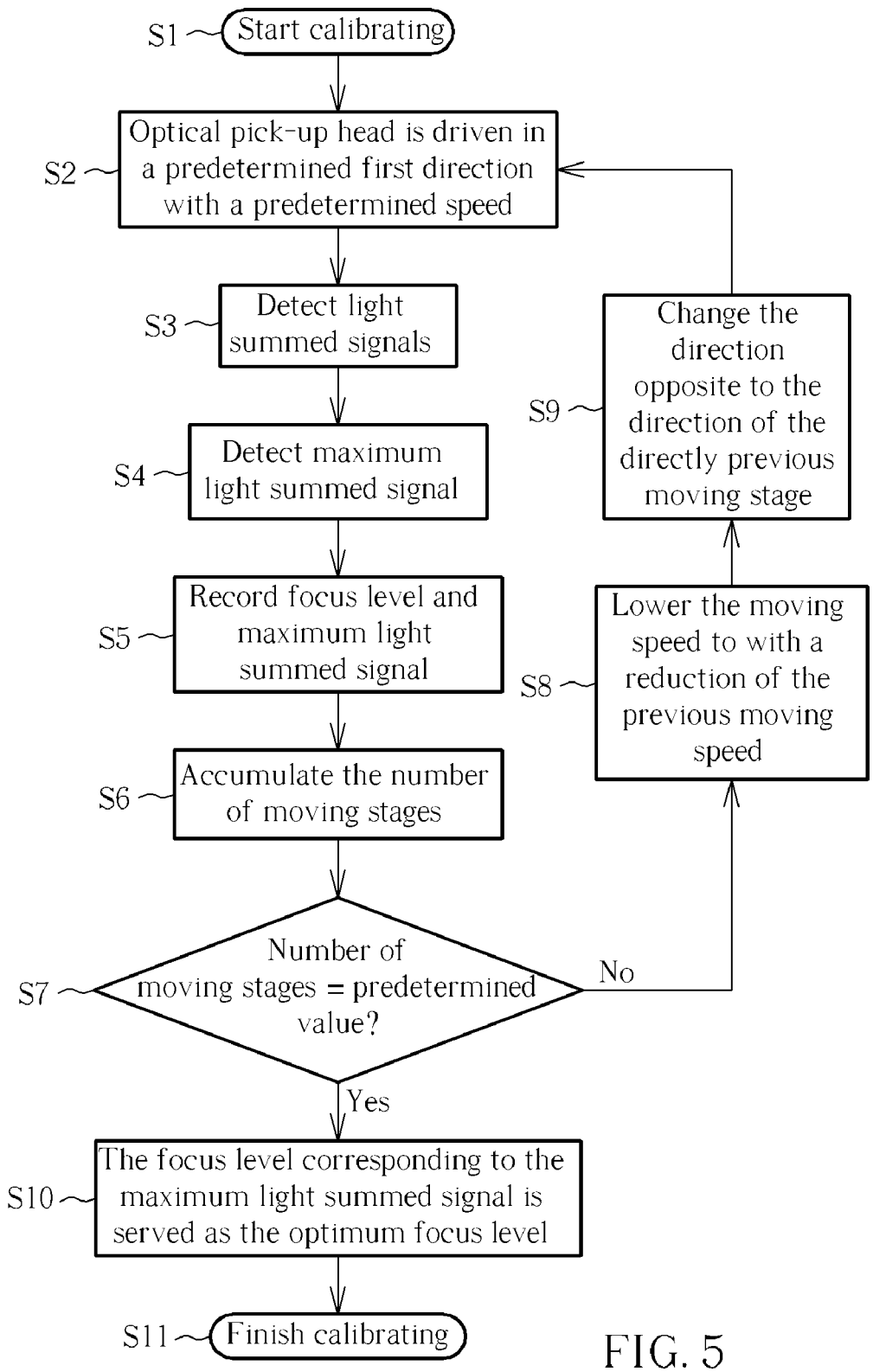
FIG. 5 is a flowchart of calibrating a focus level on the label side of the optical disc according to a first embodiment of the present invention.

FIG. 5 is a flowchart of calibrating a focus level on the label side of the optical disc according to a first embodiment of the present invention. First, in Step S1, start calibrating the focus level on a label side of an optical disc, and the accumulated number of moving stages is set to zero. Then in Step S2, the optical pick-up head is driven in a predetermined first direction with a predetermined speed. Because the optical pick-up head's position is lower than the optical disc in an optical disk drive, generally the optical pick-up head is driven up to move the optical pick-up head closer to the optical disc. Therefore, the predetermined first direction is generally set to be upwards. In addition, the predetermined speed is set at a higher speed to prevent spending much time on finding the focus level. Then, in Step S3, the method detects light summed signals along the path of the moving stage. In addition, because of the system delay, the number of detecting points is increased while the moving speed of the optical pick-up head is decreased.

In Step S4, the light summed signals detected in Step S3 are compared to determine a maximum light summed signal. And in Step S5, the maximum light summed signal and a corresponding position of the optical pick-up head are recorded as the focus level of the moving stage. After obtaining the focus level of the moving stage, Step S6 accumulates the number of the moving stages. Then in Step S7, the method predetermines a value (for example, the predetermined value is seven), and checks if the accumulated number has reached the predetermined value. If the accumulated number has not reached the predetermined value, enter Step S8, where the predetermined speed of the optical pick-up head in Step S2 is changed, and the changed speed is slower than the previous speed with a stage reduction. The stage reduction can be a constant value and the difference between moving speeds of every two adjacent two stages can be equal. The stage reduction can also be a variable value. Then in Step S9, the predetermined first direction in Step S2 is changed, and the changed direction is opposite to the predetermined first direction (i.e., moving the optical pick-up head down), and this direction is set as a second direction. Then the method returns back to Step S2 to detect the focus level of a next moving stage.

In Step S7, if the accumulated number reaches the predetermined value, enter into Step S10. In Step S10, the recorded maximum light summed signal in Step S5 and the corresponding focus level are served as the optimum focus level of the optical pick-up head. Finally, enter into Step S11 and finish calibrating a focus level.

Figure 6:
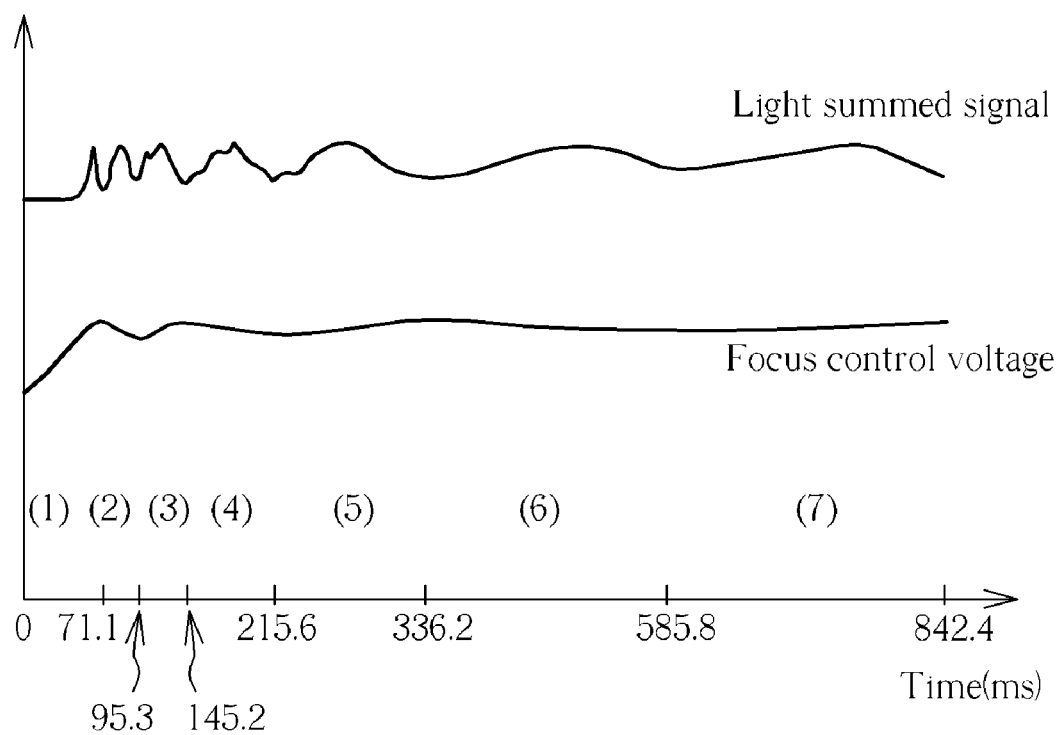
FIG. 6 is a test result of calibrating a focus level on the label side of the optical disc according to the first embodiment of the present invention.
Figure 7:
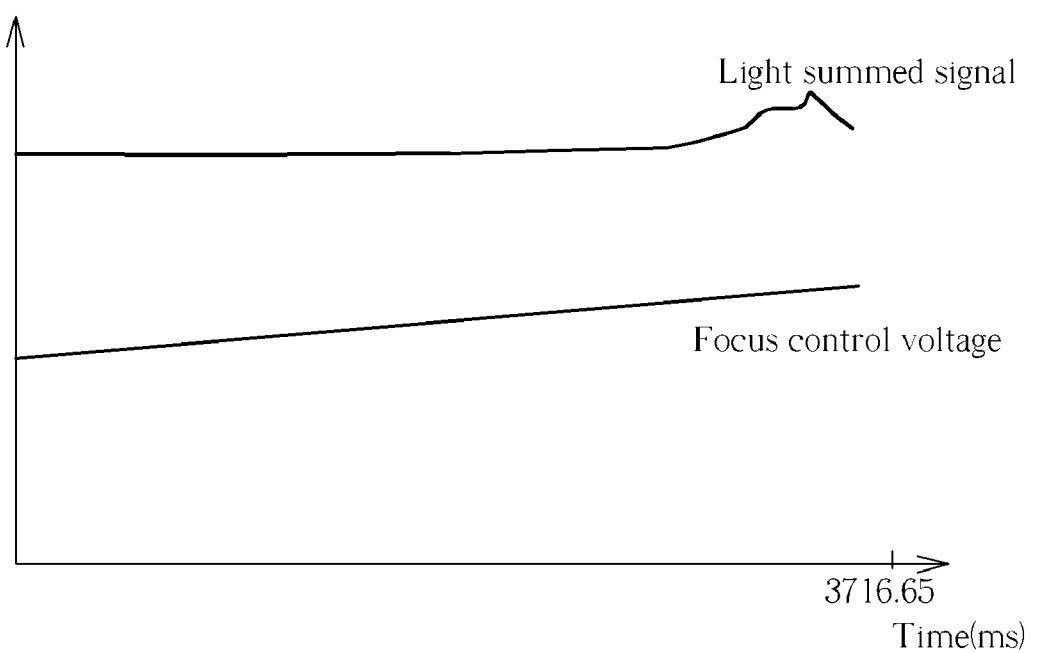
FIG. 7 is a test result of calibrating a focus level on the label side of the optical disc with a lower speed.

FIG. 6 is a test result of calibrating a focus level on the label side of the optical disc according to the first embodiment of the present invention. The test conditions are as follows: a light scribe disc is used and is rotated with a rotational speed 120 rpm (the time of one revolution is less than 500 ms); and there are seven moving stages. At a moving stage (1), a voltage with high initial slope 2.155 V/sec is used to drive the optical pick-up head, then the driving voltage is iteratively reduced to half at the following moving stages: the driving voltages of the stages (2)-(7) are 1.0775 V/sec, 0.5387 V/sec, 0.2694 V/sec, 0.1347 V/sec, 0.0673 V/sec, and 0.0337 V/sec, respectively. The driving voltages serve as focus control voltages. The time required until the focus level calibration of the $7^{th}$ moving stage is completed is 842.4 ms. However, as shown in FIG. 7, in the same test conditions, the driving voltage 0.0337 V/sec at the $7^{th}$ stage is used as a constant focus control voltage to calibrate the focus level. The time required until the focus level is found is 3716.65 ms: that is 4-5 times as the time required to find the optimum focus level according to the present invention.

According to the above-mentioned disclosure and measurements for calibrating the focus level on the label side of the optical disc, in the first embodiment, next moving stage is rapidly entered after the focus level of the current moving stage is obtained. The moving speed of the optical pick-up head is rapidly slowed down to an appropriate moving speed after several stages, and the system delay is therefore shortened and a better focus level is obtained. Compared with the method where the optical pick-up head uses a much lower speed to calibrate the focus level, the calibrating time of the present invention is shortened. Also, the system error is reduced and the efficiency of the optical disk drive can be improved.

Figure 8:
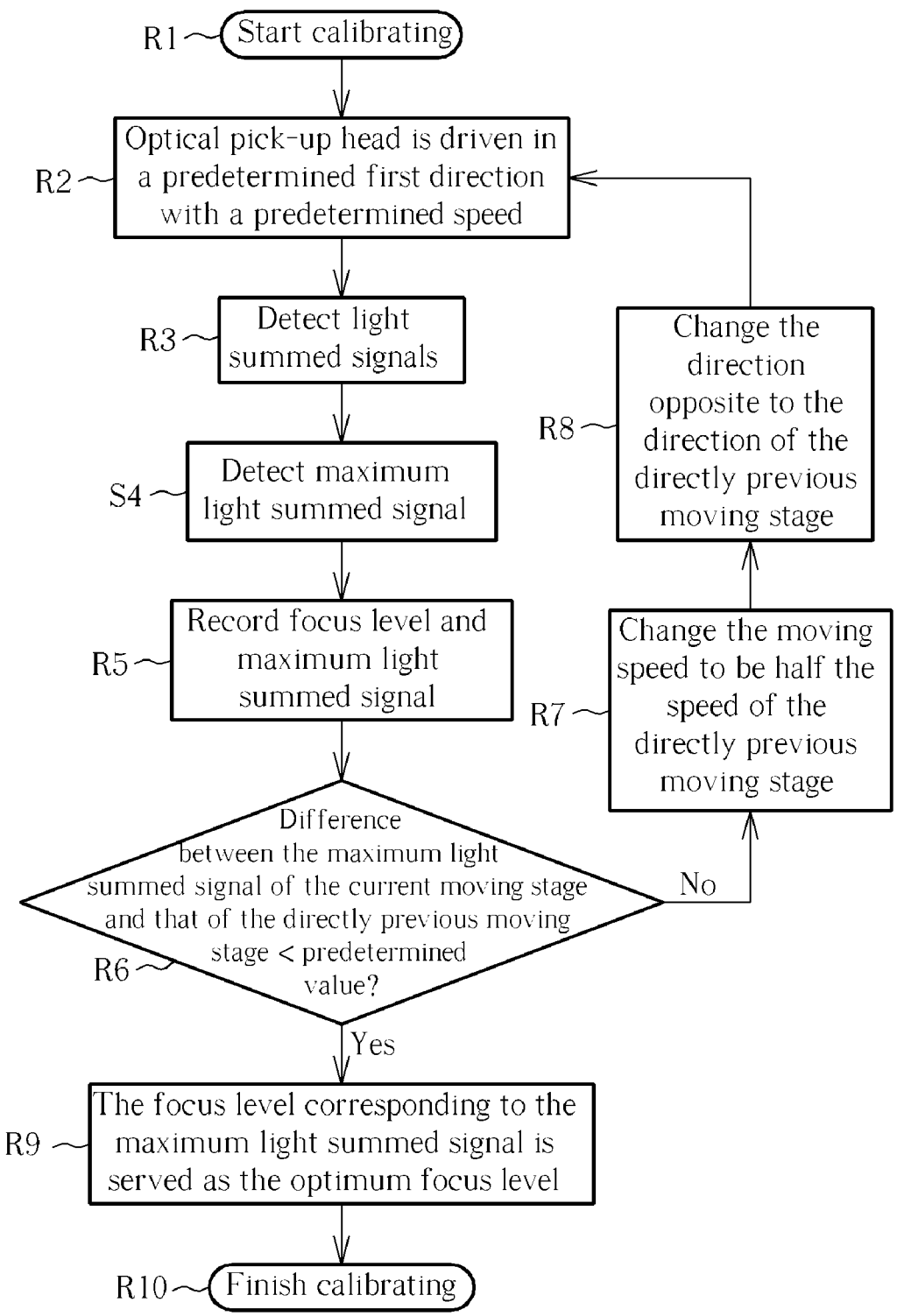
FIG. 8 is a flowchart of calibrating a focus level on the label side of the optical disc according to a second embodiment of the present invention.

FIG. 8 is a flowchart of calibrating a focus level on the label side of the optical disc according to a second embodiment of the present invention. The difference between the first and second embodiments is that in the second embodiment, the calibrating time is shortened by lowering the moving speed with a stage reduction and the optimum focus level is determined by checking the convergence of the light summed signal of the focus level of each moving stage. The detailed flow is as follows: first, in Step R1, start calibrating the focus level on a label side of an optical disc, and the accumulated number of moving stages is set to zero. Then in Step R2, the optical pick-up head is driven in a predetermined first direction with a predetermined speed. Then, in Step R3, detect light summed signals along the path of the moving stage.

In Step R4, the light summed signals detected in Step R3 are compared to determine a maximum light summed signal. And in Step R5, the maximum light summed signal and a corresponding position of the optical pick-up head are recorded as the focus level of the moving stage. After obtaining the focus level of the moving stage, in Step R6, check the convergence of the maximum light summed signal; that is, check if the difference between the maximum light summed signal of the current moving stage and the maximum light summed signal of the directly previous moving stage is less than a predetermined value. When the difference between the maximum light summed signal of the current moving stage and the maximum light summed signal of the directly previous moving stage is not less than the predetermined value, the measured focus level is determined to be far away from the actual focus level and a better focus level needs to be found. Then enter Step R7, where the predetermined speed of the optical pick-up head in Step R2 is changed, and the changed speed is half the speed of the directly previous moving stage. Follow into Step R9, where the predetermined first direction in Step R2 is changed, and the changed direction is opposite to the direction of the directly previous moving stage. Next, return to Step R2 to detect the focus level of the next moving stage.

In Step R6, if the difference between the maximum light summed signal of the current moving stage and the maximum light summed signal of the directly previous moving stage is less than the predetermined value, the convergence of the focus level is determined to be confirmed and the calibrated focus level is close to the actual focus level. Then enter into Step R9, the recorded maximum light summed signal in Step R5 and the corresponding focus level serve as the optimum focus level of the optical pick-up head. Finally, enter into Step R10 and finish calibrating the focus level.

According to the above-mentioned method for calibrating the focus level on the label side of the optical disc, in the second embodiment, the moving speed of the optical pick-up head is rapidly slowed down by lowering the speed with a stage reduction. Therefore, the system delay is shortened and a better focus level is obtained. Whether the focus level is close to the actual focus level or not can be determined by checking the convergence of the maximum light summed signals of two adjacent moving stages. Therefore, the calibrating time for finding the focus level is shortened and the efficiency of the optical disk drive is improved. In addition, the present invention can find the optimum focus level without using data patterns as support. The present invention can especially be applied to light scribe label patterns on the label side of the optical disc.

The above-mentioned statements are the preferred embodiments of the present invention, and the scope of the present invention is not limited in theses preferred embodiments. Any alternative design according to the present invention should be in the scope of the present invention.

Those skilled in the art will readily observe that numerous modifications and alterations of the device and method may be made while retaining the teachings of the invention.

What is claimed is:

1. A method for calibrating a focus level on a light scribe disc, comprising:
    (1) driving a pick-up head with a predetermined speed in a predetermined direction to calibrate a focus level for a moving stage;
    (2) detecting light summed signals along the path of the moving stage;
    (3) finding and recording a maximum among the light summed signals and a corresponding position of the pick-up head as the focus level of each moving stage, at each corresponding position;
    (4) counting a number of moving stages;
    (5) checking if the number of moving stages is greater than a predetermined value, and when yes, entering step (7), and otherwise, entering a next step;
    (6) lowering the predetermined speed in step (1) with a reduction and changing the direction to be opposite to the predetermined direction, and returning to step (1);
    (7) determining the focus level of the moving stage having the maximum light summed signal recorded in step (3) as an optimum focus level; and
    (8) finishing calibrating.

2. The method for calibrating the focus level on a light scribe disc of claim 1, wherein the predetermined speed has higher initial slope.

3. The method for calibrating the focus level on a light scribe disc of claim 1, wherein the predetermined direction is upwards.

4. The method for calibrating the focus level on a light scribe disc of claim 1, wherein the predetermined value is seven.

5. The method for calibrating the focus level on a light scribe disc of claim 1, wherein the reduction of the speed in step (6) is a stage reduction.

6. The method for calibrating the focus level on a light scribe disc of claim 5, wherein the stage reduction is a constant value.

7. The method for calibrating the focus level on a light scribe disc of claim 6, wherein a difference between each stage reduction is equal.

8. The method for calibrating the focus level on a light scribe disc of claim 6, wherein the stage reduction is one half of the predetermined speed.

9. The method for calibrating the focus level on a light scribe disc of claim 5, wherein the stage reduction is a variable value.

* * * * *